United States Patent [19]

Adam et al.

[11] Patent Number: 4,742,726

[45] Date of Patent: May 10, 1988

[54] ARRANGEMENT TO LIMIT THE AXIAL PLAY OF A MOTOR-DRIVE SHAFT MOUNTED WITH PLAIN BEARINGS

[75] Inventors: Peter Adam, Hoechberg; Paul Becker; Anton Heidenfelder, both of Wuerzburg; Olai Ihle, Margetschoechheim; Werner Schilling, Wuerzburg, all of Fed. Rep. of Germany

[73] Assignee: Siemens Aktiengesellschaft, Berlin and Munich, Fed. Rep. of Germany

[21] Appl. No.: 911,704

[22] Filed: Sep. 26, 1986

Related U.S. Application Data

[63] Continuation of Ser. No. 637,409, Aug. 3, 1984, abandoned.

[30] Foreign Application Priority Data

Aug. 11, 1983 [DE] Fed. Rep. of Germany ....... 3329120

[51] Int. Cl.[4] .............................................. F16H 1/16
[52] U.S. Cl. .................................................. 74/425
[58] Field of Search ..................... 74/425, 421 A, 427, 74/395, 396, 606 R; 308/244; 384/240, 243, 248, 425, 426, 251; 310/83, 90

[56] References Cited

U.S. PATENT DOCUMENTS

| 871,227 | 11/1907 | Ljungstrom | 74/411 |
|---|---|---|---|
| 1,370,895 | 3/1921 | Loomis | 310/89 |
| 1,404,306 | 1/1922 | Levin | 310/90 |
| 1,898,945 | 2/1933 | Fitzgerald | 74/425 |
| 2,108,262 | 2/1938 | Jones | 74/425 |
| 2,177,565 | 10/1939 | Hefferin | 384/248 |
| 2,210,705 | 8/1940 | Brown | 310/90 |
| 2,536,920 | 1/1951 | Ducanis | 74/425 |
| 2,666,335 | 1/1954 | Claybourne | 74/425 |
| 2,984,757 | 5/1961 | Papworth | 310/90 |
| 3,038,346 | 6/1962 | MacFarland | 308/244 |
| 3,402,618 | 9/1963 | Thurley et al. | 74/425 |
| 3,463,951 | 8/1969 | Bauerle et al. | 310/83 |
| 3,511,920 | 5/1970 | Hertfelder | 74/425 |
| 3,549,218 | 12/1970 | Cagnon et al. | 384/425 |
| 3,848,477 | 11/1974 | Giandinoto et al. | 74/425 |
| 4,314,692 | 2/1982 | Brauer et al. | 310/83 |
| 4,321,748 | 3/1982 | Ito | 310/90 |
| 4,366,893 | 1/1983 | Klueting et al. | 74/425 |
| 4,399,380 | 8/1983 | Hirano | 310/83 |
| 4,572,979 | 2/1986 | Haar et al. | 310/83 |

FOREIGN PATENT DOCUMENTS

559955  3/1944  United Kingdom ............... 384/425

Primary Examiner—Lawrence J. Staab
Attorney, Agent, or Firm—Volker R. Ulbrich

[57] ABSTRACT

The object of the invention is to provide a means of limiting the axial play of a motor shaft while dispensing with the use of an adjustable stop screw that has to be secured separately after it has been set. In particular, and apparatus is provided that can be used with automated manipulators. For this purpose it is recommended, according to the invention, that as a stopping element a single piece disk of appropriate thickness or a single piece disk stamped parallel to the motor assembly machine out of strip material, with an axially stamped depression of appropriate depth, is to be inserted rigidly in a pocket fixed in the housing. The invention is particularly well-suited for application in small motors with a shaft mounted on plain bearings.

4 Claims, 1 Drawing Sheet

ARRANGEMENT TO LIMIT THE AXIAL PLAY OF A MOTOR-DRIVE SHAFT MOUNTED WITH PLAIN BEARINGS

This is a continuation of application Ser. No. 637,409, filed Aug. 3, 1984, now abandoned.

BACKGROUND OF THE INVENTION

The invention relates to an arrangement to limit the axial play of a motor-drive shaft mounted on plain bearings. A typical arrangement of this kind is disclosed in published German patent application DE-OS No. 31 50 572.

Typically the axial play of a motor transmission shaft in a window-lifter drive is limited with an adjusting screw that threads into the gearbox housing and is provided in front of the end of the shaft nearest the gears; the end of which checks a stop face of the motor transmission shaft. The axial clearance that exists between the stop face of the motor transmission shaft on the one hand and the stop face of the adjusting screw on the other can be increased or reduced by turning the adjusting screw.

It is required that the adjusting screw be locked in the position that determines a specific axial clearance according to the adjustment process.

SUMMARY OF THE INVENTION

The object of the present invention is to further reduce the effort required to set the permissible or desirable axial clearance, particularly with a view of the use of automated manipulators. This problem is accomplished, according to the invention, for an arrangement of the kind mentioned above.

The arrangement according to the invention makes it possible to limit the axial play by means of a simple manipulation, in which all that has to happen is for a disk to be selected from an available reservoir of disks of varying thicknesses. These disks are dependent on the comparison between the actual and desired axial clearance, or with depressions of varying lengths, or are manufactured by a punch and/or stamping press on the basis of the data fed in with regard to the actual and desired axial clearance. They are then inserted in the pocket on the side of the housing.

If, as is desirable, a motor drive is provided in which the halves of the gearbox housing can be separated, at least along the axial direction, in which case the parts of the transmission can be assembled in advance in the shell-shaped gearbox-housing segment, which can be locked shut by applying to it a second segment of the housing of a housing cover, it is particularly easy to fix the disk in place by arranging for it to be simply inserted radially in the first housing segment. A further simplification of both manufacturing and assembly can be achieved if the disk is provided, outside its stop face, with elastically deformable clamping devices that project beyond the disk level, by means of which the disk can be rigidly fixed with relation to the housing in its final position, in corresponding slit-shaped openings, which are in turn rigidly fixed in the housing.

Other features and advantages of the present invention will become apparent from the following detailed description, and from the claims.

For a full understanding of the present invention, reference should now be made to the following detailed description and to their accompanying drawings.

DETAILED DESCRIPTION

Figure 1:
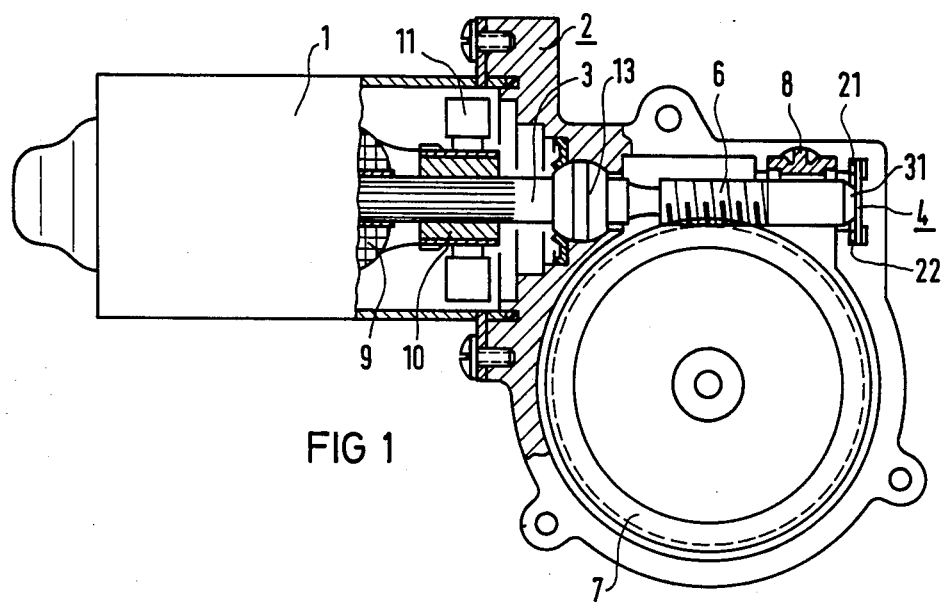
FIG. 1 shows a lengthwise partial section of a window-lifter gear for an automotive vehicle.

The window-lifter gear motor for an automotive vehicle shown in FIG. 1 includes gearbox-housing segment 2 in the shape of a half-shell and an electrical drive motor, which is flanged on its left side with rolled cylindrical housing 1. Projecting into gearbox-housing segment 2 in the shape of a half-shell is common motor-transmission shaft 3 which has mounted on the end nearest the motor a rotor 9 and a commutator 10 that slides against brush system 11, and on its free right end worm gear 6 interlocks in operation with worm wheel 7, which, in turn, can be coupled (in a manner not shown here) with further drive elements, such as the pulley of a cable-pull window lifter. The free right end of motor-transmission shaft 3 engages concave bearing 13 and is simultaneously protected against impermissible radial bendings, resulting from the worm drive, by support bearing 8. All the gears can be laid into gearbox-housing segment 2 in the shape of a half-shell in accordance with the "violin-case" principle. It can then be locked shut with a further gearbox-housing segment (not shown here) such as a gearbox cover.

Similar to the other parts of the transmission a single piece disk is used according to the invention to limit the axial play (shown in FIGS. 2–4) or a single piece disk 5 (shown in FIG. 5–7) can be inserted in gearbox-housing segment 2. For this purpose, two slit-shaped openings 21 and 22 have been provided above and below or on either side of the stop face of disk 4 or disk 5 as the case may be, against which the right-circular-cone-shaped end 31 of motor transmission shaft 3 is stopped. Disks 4 or 5 can be clamped into these openings.

Figure 2:
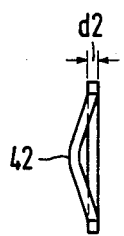
FIGS. 2 and 3 show a side view of two disks of different thicknesses for limiting the axial clearance.
Figure 3:
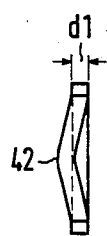
Figure 4:
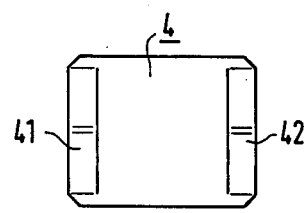
FIG. 4 shows a top view of the disk shown in FIGS. 2 and 3.
Figure 5:
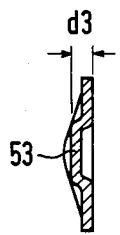
FIG. 5 shows a section of a disc with a stamped depression for limiting the axial clearance.
Figure 6:
FIG. 6 shows a side view of the disk shown in FIG. 5.
Figure 7:
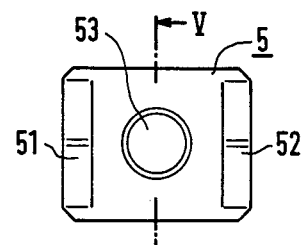
FIG. 7 shows a top view of the disk shown in FIGS. 5 and 6.

The detailed description of the disks that can be inserted or clamped into slit-shaped openings 21 and 22 is illustrated in FIGS. 2–4 and in FIGS. 5–7. FIG. 4 gives a top view of disk 4 which, on both sides of its medial stop face, has elastically deformable clamping elements that project from the disk level, by means of which the disks can be rigidly fixed in their final position in corresponding slit-shaped openings 21 and 22, wihch are in turn rigidly fixed in the housing. According to the design of the invention - as may be seen clearly from the side view shown in FIG. 2 and FIG. 3 with regard to the disk illustrated in FIG. 4 and from the side view shown in FIG. 6 with regard to the disk illustrated in FIG. 7 - there are provided, on both sides of the stop zone, elastic lugs 41, 42 and 51, 52 respectively, which are aligned with the direction of insertion and laterally stamped out of the disk or otherwise pressed out of the level of the disk. In place of the clamping elements, it is also possible to form projections on the disk, which, upon insertion into the pocket fixed in the housing, engage with it, and therefore permit an installation that is positive-locking, at least to some degree.

To adjust to the different actual axial clearances in each case, with a constant prescribed standard axial clearance, there are provided, as shown in FIGS. 2 and 3 respectively, two disks of differing thicknesses d1 and d2, as examples of what may be a much larger number of disks of varying thickness, while, as shown in FIG. 5, a depression 52, with a depth d3 stamped in the axial direction in accordance with the desired axial clearances has been pressed out of the disk in the area of its stop face.

Particularly with regard to the limitation of the axial play by means of disks with the design shown in FIGS. 5 to 7, it is advantageous to provide that the disks in each case consist of stamped or punched parts of at least one metal strip in a stamping and punching machine equipped with a device for measuring axial clearance and integrated with a motor-drive assembly machine; in this case, it is advantageous to provide that after the installation of the motor transmission shaft in gearbox-housing segment 2, the axial clearance is measured for that specific case, the defined distance required to limit the axial clearance is computed from a comparison of the actual axial clearance and the standard axial clearance, and a disk with a depression of the appropriate depth is either punched or stamped from the metal strip. Then the disk is inserted in slit-shaped openings 21 and 22 of its pocket which is fixed in the casing.

There has thus been shown and described an arrangement to limit the axial play of a motor-drive shaft mounted with plain bearings which fulfills all the objects and advantages sought therefor. Many changes, modifications, variations and other uses and applications of the subject invention will, however, become apparent to those skilled in the art after considering the specification and the accompanying drawings which disclose embodiments thereof. All such changes, modifications, variations and other uses and applications which do not depart from the spirit and scope of the invention are deemed to be covered by the invention which is limited only by the claims which follow.

What is claimed is:

1. In an arrangement to limit axial play of a motor-drive shaft mounted with plain bearings in a housing, for use as a motor transmission shaft of a window-lifter gear motor, with at least one stop element that can be rigidly fixed with respect to the housing at one end face of the shaft at a specified distance on the basis of a comparison between an actual axial clearance and a standard axial clearance, the improvement wherein the stop element is a one-piece disk of appropriate thickness which can be inserted in a pocket that is fixed in the housing with at least one opening in a region where the shaft is stopped by the disk; and the disk is provided, outside its stop face, with elastically deformable clamping elements projecting from a plan containing the stop face, by means of which the disk is rigidly insertable in its final position in a corresponding slit-shaped opening that is fixed in the housing.

2. In an arrangement limited axial play of a motor-drive shaft mounted with plain bearings in a housing, for use as a motor transmission shaft of a window-lifter gear motor, with at least one stop element that can be rigidly fixed with respect to the housing at one end face of the shaft at a specified distance on the basis of a comparison between an actual axial clearance and a standard axial clearance, the improvement wherein the stop element is a one-piece disk with a depression formed axially in the area of its stop face with an appropriate axial length which can be inserted in a pocket with at least one opening in a region where the shaft is stopped by the disk and the disk is provided, outside its stop face with elastically deformable clamping elements projecting from a plane containing the stop face, by means of which the disk is rigidly insertable in its final position in a corresponding slit-shaped opening that is fixed in the housing.

3. The arrangement according to claim 1, further comprising elastic lugs, aligned with a direction of insertion and laterally stamped out of the disk or otherwise pressed out of the plane containing the stop face, provided on either side of the stop face as the clamping elements.

4. The arrangement according to claim 2, further comprising elastic lugs, aligned with a direction of insertion and laterally stamped out of the disk or otherwise pressed out of the plane containing the stop face, provided on either side of the stop face as the clamping elements.

* * * * *